United States Patent [19]

Adachi et al.

[11] Patent Number: 4,611,674

[45] Date of Patent: Sep. 16, 1986

[54] ANALOG WEIGHING SYSTEM WITH DIGITAL PROCESSING VIA A SINGLE A/D CONVERTER

[75] Inventors: Motoyuki Adachi; Toru Kohashi, both of Hyogo, Japan

[73] Assignee: Yamato Scale Company, Limited, Japan

[21] Appl. No.: 720,696

[22] Filed: Apr. 8, 1985

[30] Foreign Application Priority Data

Apr. 9, 1984 [JP] Japan ................................. 59-71559

[51] Int. Cl.[4] .......................... G01G 9/00; G01G 3/14; G01G 23/10
[52] U.S. Cl. .................................. 177/1; 177/210 R; 177/185; 177/DIG. 3
[58] Field of Search .................... 177/1, 19, 185, 199, 177/210 R, DIG. 3

[56] References Cited

U.S. PATENT DOCUMENTS

| | | | |
|---|---|---|---|
| 3,900,844 | 8/1975 | Wald | 177/DIG. 3 X |
| 4,024,053 | 5/1977 | Drew, Jr. et al. | 177/210 R X |
| 4,379,495 | 4/1983 | Cocks et al. | 177/185 X |
| 4,502,555 | 3/1985 | Gower | 177/199 X |
| 4,535,857 | 8/1985 | Haze | 177/DIG. 3 X |

Primary Examiner—E. A. Goldberg
Assistant Examiner—Patrick W. Foster
Attorney, Agent, or Firm—Senniger, Powers, Leavitt and Roedel

[57] ABSTRACT

A weighing system, including a plurality of conveyer-type continuous weighing machines each having an analog weighing unit and a digital measurement processing unit, and a single common analog-to-digital convertor operated in time division fashion.

7 Claims, 4 Drawing Figures

ANALOG WEIGHING SYSTEM WITH DIGITAL PROCESSING VIA A SINGLE A/D CONVERTER

BACKGROUND OF THE INVENTION

This invention relates to a weighing system including a plurality of weighing machines, especially of conveyer-type, which are operated independently of one another.

The opened Japanese patent specification No. 59-50318 discloses a conveyer-type continuous weighing machine, in which articles conveyed by a belt or chain conveyer are weighed successively in analog fashion and the measurements are processed in digital fashion. For this purpose, each of such weighing machines is provided with its own analog-to-digital (A/D) convertor. In a large plant, it is a general practice to install a number of such weighing machines and to operate them at the same time independently of one another.

SUMMARY OF THE INVENTION

Accordingly, an object of this invention is to provide an improved weighing system including a plurality of such weighing machines which can operate independently but have a single common A/D convertor, in order to reduce the cost of installation.

In accordance with this invention, a weighing system having a plurality of analog weighing units and a plurality of digital measurement processing units is provided. As a feature of this invention, a common A/D convertor is inserted between these analog and digital units and coupled to the analog units through a first time division switch and to the digital units through a second time division switch.

These and other objects and features of this invention will be described in more detail below with reference to the accompanying drawings.

DESCRIPTION OF A PREFERRED EMBODIMENT

Figure 1:
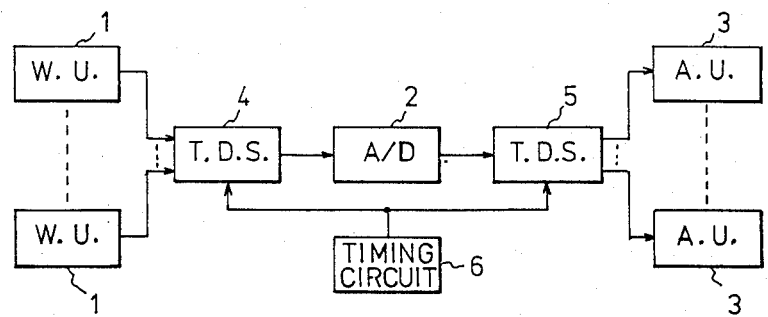
FIG. 1 is a block diagram representing a scheme of the system according to this invention.

As shown in FIG. 1, the inventive system includes a plurality of sets of analog weighing units 1 and corresponding digital arithmetic units 3 and a common A/D convertor 2 having an input coupled through a first time division switch 4 to weighing units 1 and an output coupled through a second time division switch 5 to arithmetic units 3. The system also includes a timing circuit 6 for controlling both time division switches 4 and 5, as described below.

In this system, weight signals independently produced from weighing units 1 are supplied to first time division switch 4 at the same time or with some time differences. The switch 4 sequentially samples these weight signals and supplies these samples sequentially to A/D convertor 2 to convert them into digital form. The digitized samples are then supplied sequentially to second switch 5 which distributes them to corresponding arithmetic units 3. The arithmetic unit 3 can be constructed arbitrarily and may have an averaging function for removing low frequency noise component as disclosed in the above-cited opened Japanese patent specification and also described in conjunction with the following embodiment.

Figure 2:
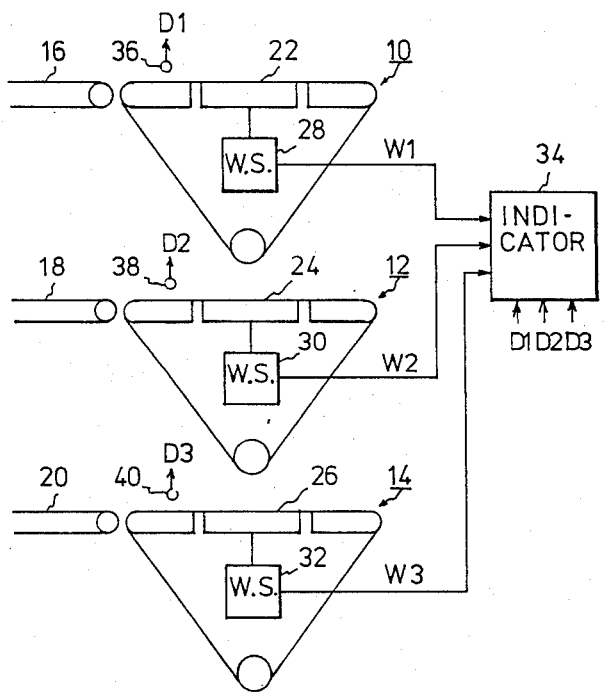
FIG. 2 is a schematic structural diagram representing an embodiment of the weighing system of this invention.

Referring to FIG. 2, this embodiment includes three chain conveyer weighing units 10, 12 and 14 for weighing articles fed by feeding conveyers 16, 18 and 20, respectively, while they are moving on weighing cradles 22, 24 and 26, respectively. The weights of the articles on weighing cradles 22, 24 and 26 are sensed by weight sensors 28, 30 and 32 mechanically coupled to cradles 22, 24 and 26, respectively, and weight sensors 28, 30 and 32 provide analog weight indicative signals W1, W2 and W3, respectively, to a weight indicator unit 34 which will be described below with reference to FIGS. 3 and 4. Weighing units 10, 12 and 14 also include optical detectors 36, 38 and 40 for detecting articles fed onto weighing cradles 22, 24 and 26 to provide detection signal pulses D1, D2 and D3, respectively, to indicator unit 34.

Figure 3:
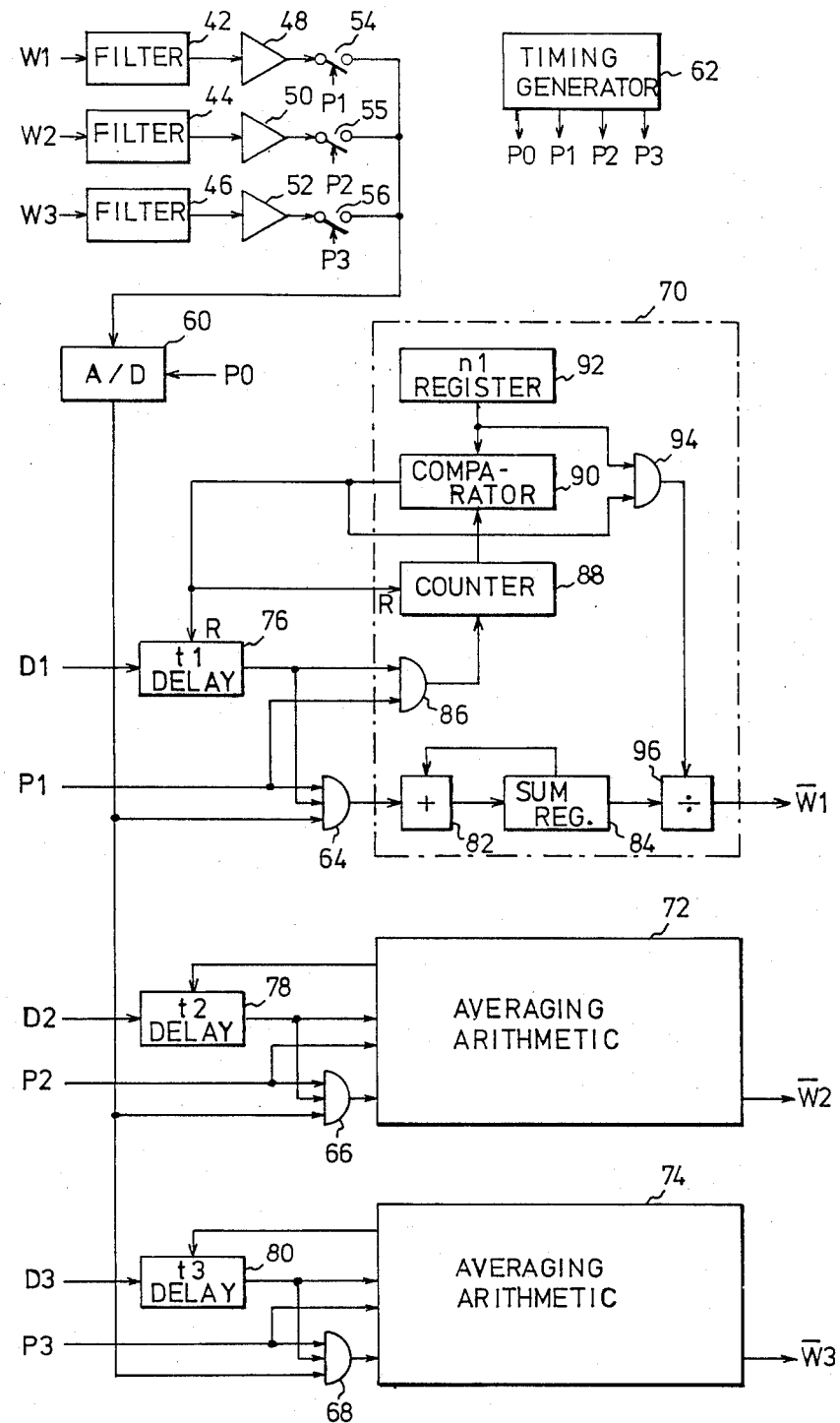
FIG. 3 is a block diagram representing a part of the embodiment of FIG. 2.

Referring next to FIG. 3 representing a major part of weight indicator unit 34 of FIG. 2, analog weight indicative signals W1, W2 and W3 are shaped, respectively, by suitable filters 42, 44 and 46 and amplified by amplifiers 48, 50 and 52. The amplified signals W1, W2 and W3 are shown in FIG. 4, in timing relation with respect to detection signals D1, D2 and D3.

The output signals W1, W2 and W3 of amplifiers 48, 50 and 52 are supplied, respectively, through normally open analog switches 54, 55 and 56 each having a control terminal to a common A/D convertor 60. A timing signal generator 62 is provided for supplying a clock pulse train P0 to A/D convertor 60 and three timing pulse trains P1, P2 and P3 to control terminals of analog switches 54, 55 and 56, respectively. The A/D convertor 60 is arranged to effect A/D converting action during the duration of each clock pulse P0 and the switches are arranged to open during the durations of timing pulses P1, P2 and P3, respectively, to pass weight indicative signals W1, W2 and W3 to A/D convertor 60.

Figure 4:
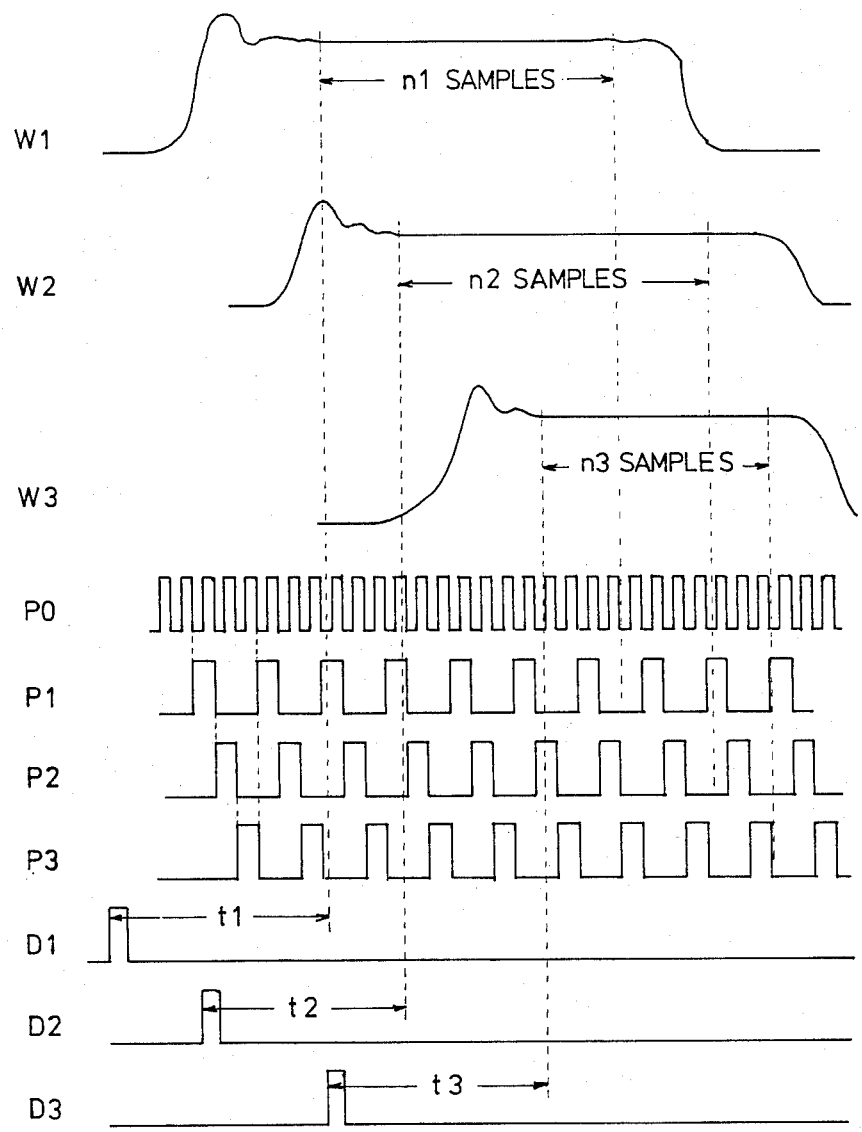
FIG. 4 is a waveform diagram used to explain the operation of the embodiment of FIGS. 2 and 3.

As shown in FIG. 4, the timing relationship of these pulses P0, P1, P2 and P3 is preset such that the trailing edge of pulse P1 coincides with the leading edge of pulse P2, the trailing edge of pulse P2 coincides with the leading edge of pulse P3 and the trailing edge of pulse P3 coincides with the leading edge of pulse P1, and that each pulse P0 always exists within the duration of pulse P1, P2 or P3. Accordingly, analog signals W1, W2 and W3 are sequentially sampled by pulses P1, P2 and P3, respectively, with no mutual interference and converted into digital form in response to pulses P0.

Returning to FIG. 3, the output signal of A/D convertor 60, which is a series of digital samples of weight signals W1, W2 and W3 arranged cyclically in a mutually intervening relationship, is applied through AND gates 64, 66 and 68 to averaging arithmetic units 70, 72 and 74 respectively. Timing pulses P1, P2 and P3 are applied also to AND gates 64, 66 and 68, respectively, as their first control signals. By the control of timing pulses P1, P2 and P3 which also control sampling switches 54, 55 and 56, respectively, AND gates 64, 66 and 68 are opened for the durations of respective pulses P1, P2 and P3 to pass the corresponding digital samples of W1, W2 and W3, respectively. Thus, the output signals of AND gates 64, 66 and 68 consist purely of the digital samples of W1, W2 and W3, respectively. At the second control input signals of AND gates 64, 66 and 68, detection signals D1, D2 and D3 are applied through delay units 76, 78 and 80 having characteristic delay times t1, t2 and t3, respectively. As shown in FIG. 4, delay times t1, t2 and t3 are time periods needed by respective weighing units 10, 12 and 14 (FIG. 2) for reaching their stable states in which their weight signals W1, W2 and W3 are stabilized substantially, after the leading edges of detection signals D1, D2 and D3, respectively. The delay units 76, 77 and 78 are also arranged to deliver their output signals continuously until they are reset. Thus, the digital samples of weight signals W1, W2 and W3 are supplied respectively to arithmetic units 70, 72 and 74 in response to timing signals P1, P2 and P3 after weight signals W1, W2 and W3, respectively are stabilized.

As the arithmetic units 70, 72 and 74 are essentially same in structure and operation, only arithmetic unit 70 will be described.

In arithmetic unit 70, AND gate 64 provides an output signal, which is a digital sample of weight signal W1, to an adder circuit 82 in response to every timing pulse P1. The adder circuit 82 constitutes an accumulator with a sum register 84 which stores the sum output signal of adder 82 and supplies its content to adder 82 as an addend to the next input signal. Timing pulses P1 applied to AND gate 64 are also applied through AND gate 86 to counter 88 to be counted and the output count of counter 88 is compared in a comparator 90 with a preset count n1 of a register 92. As shown in FIG. 4, the count n1 is the number of samples of weight signal W1 sampled by timing pulses P1 within the stable region of W1 signal and may be selected experimentally (e.g., five in FIG. 4). The predetermined numbers n2 and n3 are also preset in corresponding registers in the other arithmetic units 72 and 73, respectively. When the count of counter 88 reaches n1, comparator 90 produces a control pulse which is applied to delay unit 76 and counter 88 to reset them and also to AND gate 94 to enable it. Thus, the content n1 of register 92 is passed to a divisor input of a divider circuit 96 whose dividend input is coupled to receive the content of sum register 84, which is a sum of n1 samples of W1 signal. Thus, this sum weight is divided by n1 in divider 96 which provides an average weight $\overline{W1}$. This averaged value may be displayed as a measured value by a suitable display unit (not shown). Similarly, average weights $\overline{W2}$ and $\overline{W3}$ are provided from arithmetic units 72 and 74, respectively, for display in time division fashion.

While, in the above embodiment, the arithmetic units were described as those having a function of averaging the sampled weights, it should be noted that this invention must not be limited thereto. For example, the arithmetic units may have a function of tare correction or the like. Moreover, each of the respective arithmetic units may have a different function since the units are essentially independent of each other.

We claim:

1. A weighing system, comprising a plurality of analog weighing units for weighing product to provide analog weight indicative signals, a plurality of digital measured weight processing units corresponding respectively to said weighing units for processing digitally said weight indicative signals, a common analog-to-digital convertor, a first switch means for coupling said weighing units to said analog-to-digital convertor in response to time division control signals, a second switch means for coupling said analog-to-digital convertor to said weight processing units in response to time division control signals, and means for providing time division control signals to said first and second switch means so that the weight indicative signals of the weighing units are processed by respective digital measured weight processing units.

2. A weighing system as set forth in claim 1 wherein a predetermined number of weight indicative signals are provided by said first and second switch means to said measured weight processing units and wherein at least one of said measured weight processing units includes means for averaging the predetermined number of signals.

3. A weighing system as set forth in claim 1 wherein said means for providing time division control signals includes means for delaying the digital processing of said weight indicative signals until the signals are substantially stable.

4. A weighing system as set forth in claim 3 wherein all digital measured weight processing units process said weight indicative signals substantially at the same time.

5. A weighing system as set forth in claim 3 wherein said delaying means is initiated by optical sensing means for detecting the presence of product for weighing.

6. A weighing system as set forth in claim 1 further comprising sensing means for detecting the presence of product for weighing and wherein said means for providing time division control signals includes means for delaying the digital processing of said weight indicative signals for a predetermined time after detection of product by said sensing means.

7. A method of weighing comprising the steps of:
providing a plurality of analog weighing units adapted for producing analog weight indicative signals;
providing a single analog to digital convertor for converting said analog weight indicative signals to digital weight indicative signals;
providing a plurality of processing units, one for each weighing unit, each processing unit being adapted for processing the digital weight indicative signals of its respective weighing unit;
coupling said analog weighing units and said processing units to the analog to digital convertor; and
controlling said coupling so that the weight indicative signals of respective weighing units are processed by corresponding processing units.

* * * * *